(12) United States Patent
Johnson

(10) Patent No.: US 7,622,672 B2
(45) Date of Patent: Nov. 24, 2009

(54) ELECTRICAL HOUSING KNOCKOUT DEVICE AND METHOD

(76) Inventor: Richard A. Johnson, 3188 Pluto Cir., North Fort Myers, FL (US) 33903

( * ) Notice: Subject to any disclaimer, the term of this patent is extended or adjusted under 35 U.S.C. 154(b) by 281 days.

(21) Appl. No.: 11/683,258

(22) Filed: Mar. 7, 2007

(65) Prior Publication Data
US 2008/0219789 A1 Sep. 11, 2008

(51) Int. Cl.
*H02G 3/08* (2006.01)
*B23B 51/05* (2006.01)

(52) U.S. Cl. .............................. 174/50; 174/53; 174/57; 220/3.2; 408/204

(58) Field of Classification Search .................. 174/480, 174/481, 50, 53, 57, 58, 17 R, 135, 71 R, 174/40; 220/3.2–3.9, 4.02; 81/426, 418, 81/342, 311, 305, 325, 351, 378; 248/68.1, 248/49, 56; 30/92, 94, 95, 105, 492, 454, 30/359; 29/49, 835, 837, 848
See application file for complete search history.

(56) References Cited

U.S. PATENT DOCUMENTS

| | | | |
|---|---|---|---|
| 3,579,797 A | 5/1971 | Pepe | |
| 3,604,092 A | 9/1971 | Knickerbocker | |
| 3,736,643 A | 6/1973 | Pepe | |
| 4,167,056 A | 9/1979 | Nattel | |
| 4,509,242 A * | 4/1985 | Marra | 30/359 |
| 4,569,128 A | 2/1986 | Thomas | |
| 5,058,414 A * | 10/1991 | Hayes | 81/426 |
| 5,577,328 A | 11/1996 | Kerry, Sr. | |
| 5,778,720 A | 7/1998 | Olexa, Jr. | |
| 5,937,695 A | 8/1999 | Patterson | |
| 6,216,568 B1 * | 4/2001 | Breiling | 81/426 |
| 7,194,937 B1 * | 3/2007 | Melkowits | 81/426 |
| 7,383,628 B1 * | 6/2008 | Robinett et al. | 81/342 |

* cited by examiner

*Primary Examiner*—Angel R Estrada
(74) *Attorney, Agent, or Firm*—The Livingston Firm; Edward M. Livingston, Esq.; Bryan L. Loeffler, Esq.

(57) ABSTRACT

A electrical housing knockout device (4) having a bracket (5) with a horizontal side (7) perpendicularly secured to a vertical side (6) and a sleeve element (8) connected to the horizontal side (7). The sleeve element (8) includes a shaft (9) and a base (10) wherein a central opening (12) extends through the shaft (9) and base (10). The sleeve element (8) also includes a collar (11) located between the shaft (9) and base (10) wherein the collar (11) has an aperture (14). The sleeve element (8) extends from the collar (11) at a predetermined angle. The collar (11) is adjacent to the horizontal side (7) and is positioned such that the collar aperture (14) is pivotal about a stopper (15) which extends from the horizontal side (7). A means for securing the bracket (5) to the interior of a junction box (1) or circuit breaker box (26) is also included.

19 Claims, 4 Drawing Sheets

ELECTRICAL HOUSING KNOCKOUT DEVICE AND METHOD

BACKGROUND OF THE INVENTION

This invention relates to electrical housings having pre-punched knockouts, such as junction boxes and circuit breaker cabinets, more particularly, an electrical housing knockout device having a sleeve element so as to permit a person to quickly and easily create a hole in a desired knockout from within the electrical housing. Once the hole is created, the user then inserts a tool through the hole so as to apply a force on the exterior of the knockout, thereby removing the knockout.

Currently, junction boxes, also known as electrical boxes, include a plurality of pre-punched "knockouts", or removable pieces of the junction box, that are removed to allow an electrical raceway to be inserted into the junction box. The knockouts are typically constructed such that a user must exert a force on the exterior of the knockout towards the interior of the junction box to remove the knockout.

During new construction, a person typically removes the desired knockout(s) prior to insertion of the junction box into a wall as it is easier to hold the junction box in one's hand and apply the necessary force to the exterior of the knockout(s) to remove the knockout(s). In the alternative, if the junction box is already installed in a wall but the wall is unfinished, meaning that the exterior of the junction box is readily accessible, the person may also easily remove the desired knockout(s) as he/she will have enough room to manipulate his/her tool to exert force on the exterior of the knockout(s).

However, if an electrician is installing new wiring in an installed junction box in a finished wall, difficulties arise due to being unable to access the exterior of the junction box. In some cases, an electrician may attempt to remove the knockout from within the junction box, by using a drill bit attached to a drill to maneuver the bit against the knockout. However, the drill bit oftentimes falls off of the drill as the perimeter of the junction box severely limits the degree of movement of the drill bit. In addition, because the knockouts are constructed to as to be removed when force is exerted on the exterior of the knockout, a greater force is required to remove the knockouts when force is exerted on the interior of the knockout as opposed to the exterior. Accordingly, the required leverage and force needed to punch out the knockout is not achieved. Thus, in many cases, electrician will just install a new junction box rather than attempt to punch out a knockout in an already installed junction box.

In addition, an electrician experiences the same difficulties with removing knockouts from circuit breaker cabinets or other electrical housings having pre-punched knockouts as these housings also use the same types of knockouts which require force to be exerted on the exterior of the electrical housing, rather than the interior.

Thus, a need exists for an electrical housing knockout device and method that permits a person to quickly and easily create a hole in a desired knockout from within the junction box/circuit breaker cabinet.

The relevant prior art includes the following references:

| U.S. Pat. No. (U.S. unless stated otherwise) | Inventor | Issue/Publication Date |
| --- | --- | --- |
| 5,778,720 | Olexa, Jr. | Jul. 14, 1998 |
| 4,569,128 | Thomas | Feb. 11, 1986 |
| 5,577,328 | Kerry, Sr. | Nov. 26, 1996 |
| 3,736,643 | Pepe | Jun. 05, 1973 |
| 3,579,797 | Pepe | May 25, 1971 |
| 4,167,056 | Nattel | Sep. 11, 1979 |
| 5,937,695 | Patterson | Aug. 17, 1999 |
| 3,604,092 | Knickerbocker | Sep. 14, 1971 |

SUMMARY OF THE INVENTION

The primary object of the present invention is to provide an electrical housing knockout device that permits a person to quickly and easily create a hole in a desired knockout from within the junction box/circuit breaker cabinet to assist in removal of the knockout.

Another object of the present invention is to provide an electrical housing knockout device that is adjustable.

A further object of the present invention is to provide an electrical housing knockout device that is easy to use.

An even further object of the present invention is to provide an electrical housing knockout device that is securable within an electrical housing.

The present invention fulfills the above and other objects by providing an electrical housing knockout device having a bracket with a horizontal side perpendicularly secured to a vertical side and a sleeve element having a central opening wherein the sleeve element is connected to the horizontal side, preferably in a pivotal manner. The sleeve element includes a shaft and a base wherein the central opening extends through the shaft and base. The sleeve element also includes a collar located between the shaft and base wherein the collar has an aperture. The shaft extends from the collar at a predetermined angle. The collar is adjacent to the horizontal side and is positioned such that the collar aperture is pivotal about a stopper which extends from the horizontal side. A means for securing the bracket to the interior of an electrical housing is also included.

To use the present invention, a person inserts the electrical housing knockout device within an interior of an electrical housing. The person then positions the horizontal side of the bracket against the desired knockout to be removed. The sleeve element, which may be fixedly secured to the bracket or pivotally secured to the bracket, is aligned with the central opening of the desired knockout to be removed or is pivoted about the stopper so as to align the central opening with the desired knockout to be removed. A drill bit attached to a drill is then inserted into the central opening and drill bit is then removed from the central opening and the electrical housing knockout device is removed from the electrical housing. The person then inserts a punch or other elongated tool within the hole such that a portion of the punch or tool is located outside the exterior of the electrical housing. Finally, the person manipulates the punch or tool so as to exert a force on the outside of the knockout, thereby removing the knockout from the electrical housing.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
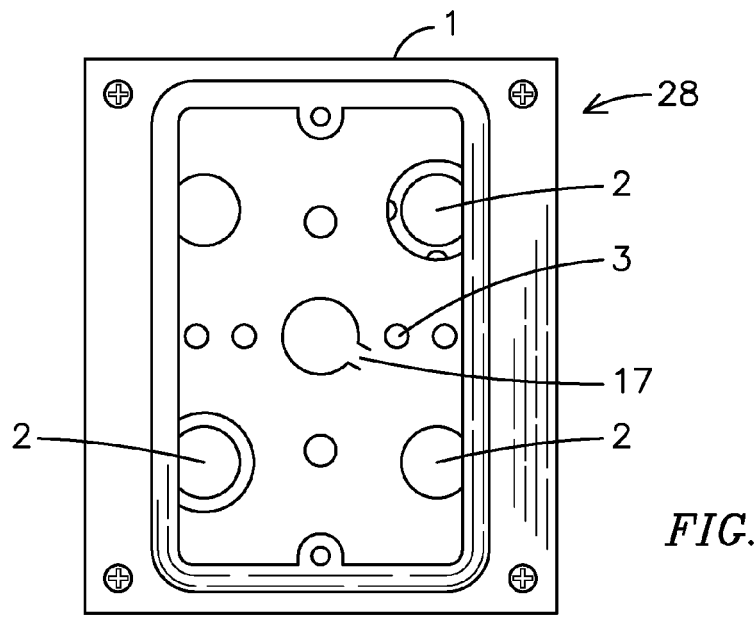
FIG. 1 is a front view of a junction box having a plurality of pre-punched knockouts.
Figure 2:
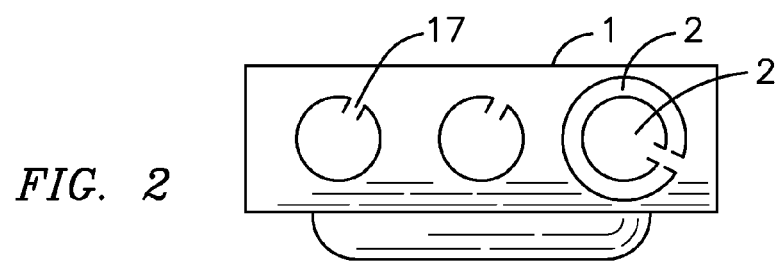
FIG. 2 is a top view of a junction box having a plurality of pre-punched knockouts.

For purposes of describing the preferred embodiment, the terminology used in reference to the numbered components in the drawings is as follows:

1. junction box
2. knockout
3. junction box screw hole
4. electrical housing knockout device, generally
5. bracket
6. vertical side
7. horizontal side
8. sleeve element
9. shaft
10. base
11. collar
12. central opening
13. securing means
14. collar aperture
15. stopper
16. drill bit
17. tab
18. horizontal side opening
19. magnet
20. vertical side proximal surface
21. vertical side distal surface
22. horizontal side top surface
23. horizontal side bottom surface
24. screw
25. drill
26. circuit breaker cabinet
27. tightening means
28. electrical housing
29. slot
30. first end -continued 31. second end
32. electrical housing wall
33. hole
34. tool With reference to FIGS. 1 and 2, varying views of a junction box are shown. An electrical housing 28, such as a junction box 1, typically includes a plurality of pre-punched knockouts 2 having tabs 17 that are used for the accommodation of electrical raceways the wires housed therein. To remove the knockouts 2, force is exerted on the exterior of the junction box 1 against the desired knockout 2 to be removed. The junction box 1 may also include a plurality of junction box screw holes 3 for the grounding of the electrical raceways and/or securing the junction box 1 to a suitable surface.

Figure 3:
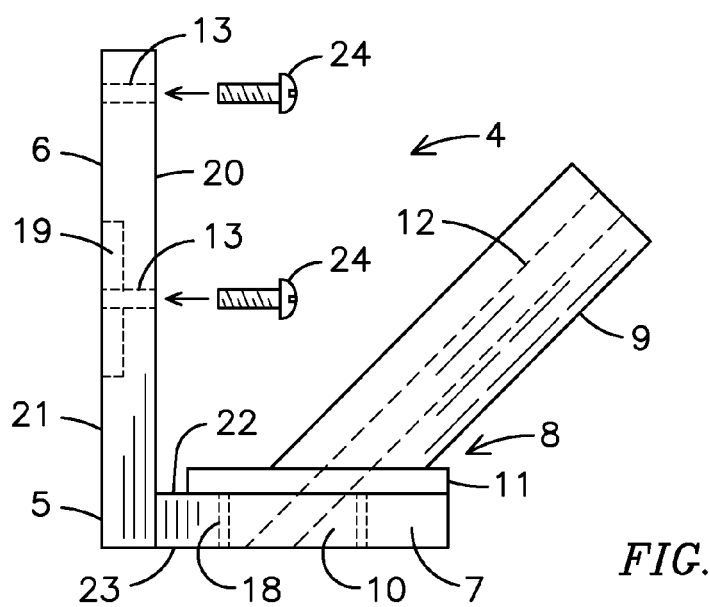
FIG. 3 is a side plan view of a first embodiment of an electrical housing knockout device of the present invention.

In FIG. 3, a side plan view of a first embodiment of an electrical housing knockout device of the present invention is shown. The electrical housing knockout device, generally 4, includes a bracket 5 and a sleeve element 8 which is preferably pivotally secured to the bracket 5. More specifically, the bracket 5 includes a vertical side 6 having a proximal surface 20 and a distal surface 21 and a horizontal side 7 having a top surface 22 and a bottom surface 23. The horizontal side 7 is perpendicularly secured to the vertical side 6. The sleeve element 8 includes a shaft 9, which is preferably cylindrical, a base 10, which is preferably round, and a collar 11. A central opening 12 extends through the shaft 9 and through the base 10. The horizontal side 7 includes a horizontal side opening 18 sized and shaped for accommodation of the base 10. At least one securing means 13, which may be a hole located on the vertical side 6, permits a user to secure the electrical housing knockout device 4 to the interior of a junction box, preferably via screws 24. In addition or in the alternative, other means for securing the bracket 5 to the interior of the junction box 1 may be used, such as at least one magnet 19 located on the vertical side 6. The shaft 9 extends from the collar 11, preferably at a predetermined angle of 45 degrees or 54 degrees, so as to provide for proper positioning of a drill bit.

Figure 4:
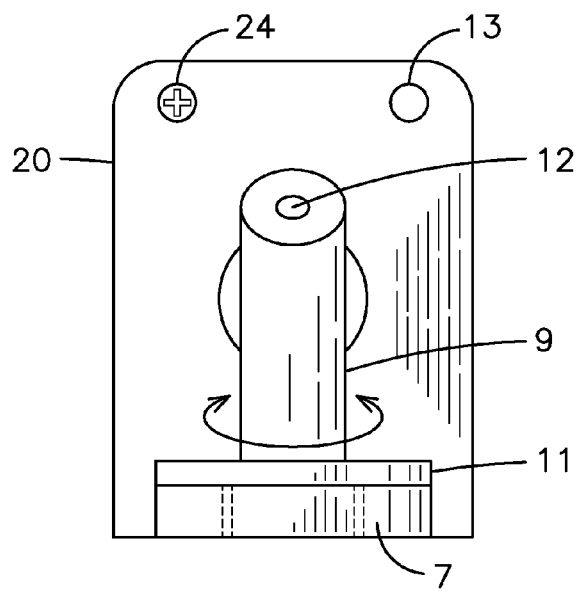
FIG. 4 is a front view of an electrical housing knockout device of the present invention.
Figure 5:
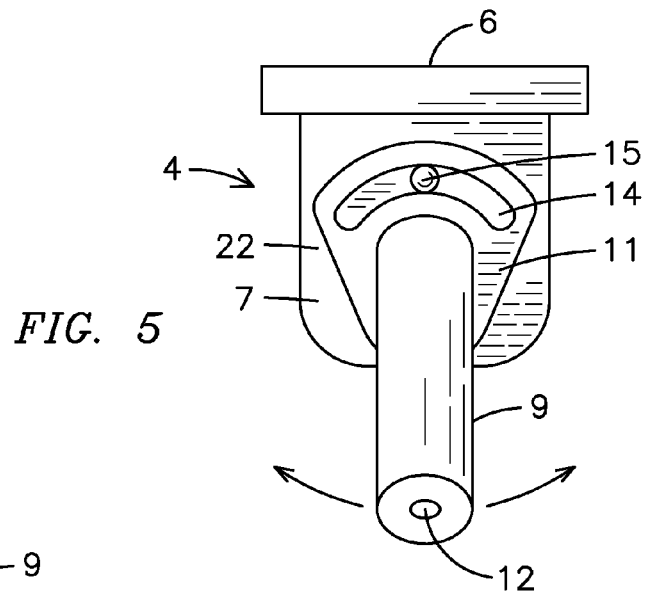
FIG. 5 is a top view of the embodiment of FIG. 4.

With reference to FIGS. 4 and 5, varying views of a electrical housing knockout device of the present invention are shown. The sleeve element 8 includes a collar aperture 14 located on the collar 11 having a predetermined size and shape. A stopper 15, which is preferably a pin, extends a predetermined distance above the horizontal side 7 and is sized so as to fit within the collar aperture 14 and a predetermined distance above the collar 11. When the sleeve element 8 is pivoted, the shaft 9 is rotated to the left or right. Because the stopper 15 extends a predetermined distance above the collar 11, the sleeve element 8 remains adjacent to the horizontal side. In this manner, a person may position the central opening 12 in direct alignment with the desired knockout 2 to be removed.

Figure 6:
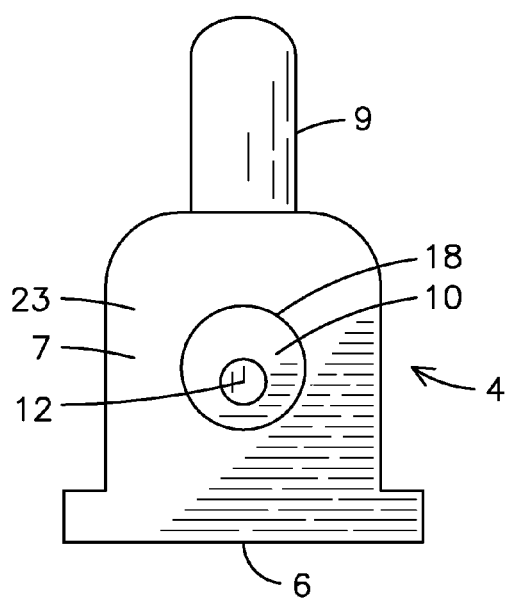
FIG. 6 is a bottom view of the embodiment of FIG. 4.

In FIG. 6, an upward looking view of the embodiment of FIG. 4 is shown. When the sleeve element 8 is pivoted, the base 10 rotates within the horizontal side aperture 18. Thus, the entire sleeve element 8 moves when the shaft 9 is pivoted.

Figure 7:
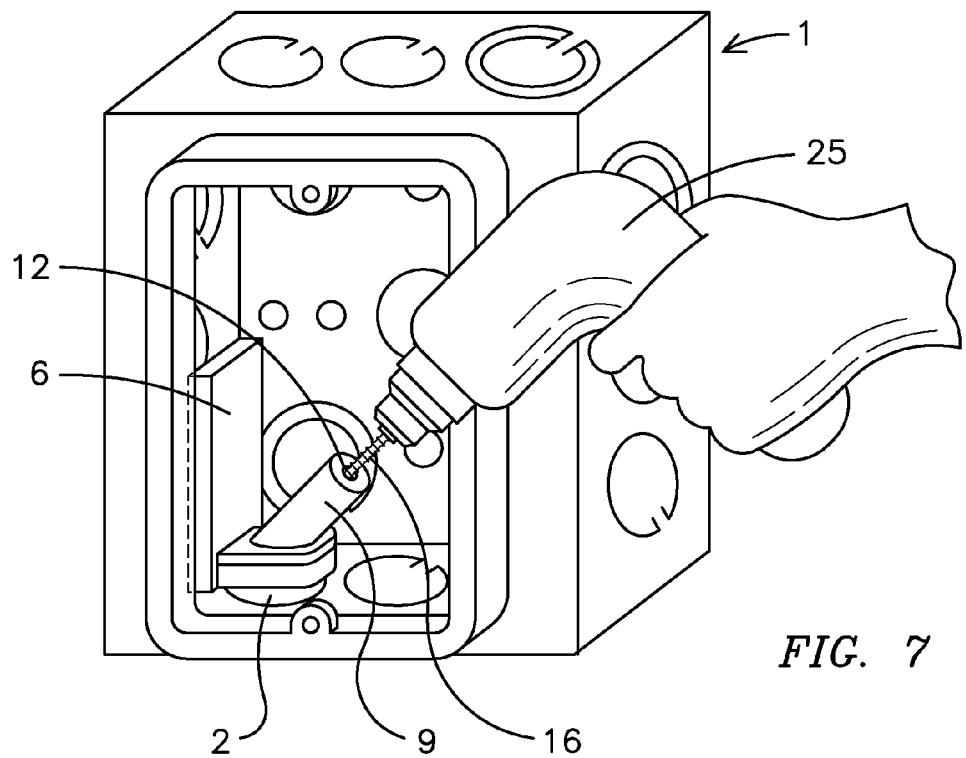
FIG. 7 is a perspective view of an electrical housing knockout device of the present invention in use.

Next, FIG. 7 shows a perspective view of an electrical housing knockout device of the present invention in use. To use the electrical housing knockout device 4 within an interior of a junction box 1, the person first positions the horizontal side 7 of the bracket against the desired knockout 2 to be removed. When the horizontal side 7 is located against the desired knockout 2, the vertical side 6 should also preferably be located against an interior wall of the junction box 1. The sleeve element 8 is then pivoted about the stopper 15 so as to align the central opening 12 with the desired knockout 2 to be removed. A drill bit 16 attached to a drill 25 is then inserted into the central opening 12 and the drill 25 is powered so as to create a hole in the desired knockout 2. The drill bit 16 is then removed from the central opening 12 and the junction box knockout device 4 is then removed from the junction box 1. The person then inserts a punch or other elongated tool within the newly created hole such that a portion of a punch or other tool is located outside of the junction box 1. Finally, the person manipulates the punch or tool so as to exert a force on the outside of the knockout 2, thereby removing the knockout 2 from the junction box 1.

Figure 8:
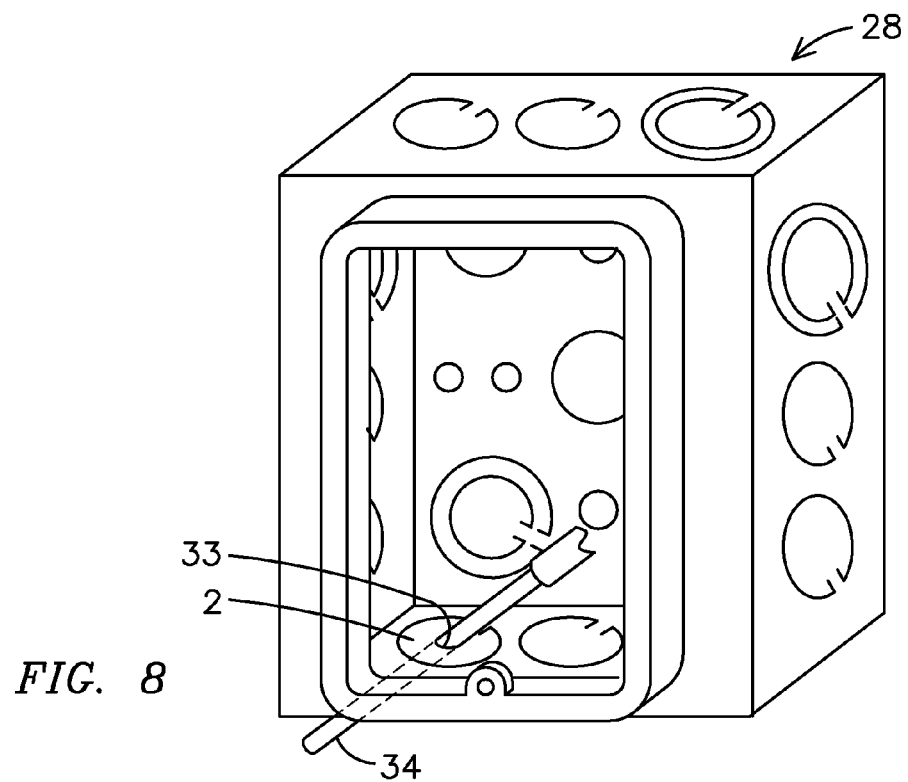
FIG. 8 is a perspective view of an electrical housing after using the electrical knockout device of the present invention when a knockout is being removed.

Next, FIG. 8 shows a perspective view of an electrical housing after using the electrical knockout device of the present invention when a knockout is being removed. After a hole 33 is created in a desired knockout 2 by using the electrical housing knockout device 4 of the present invention, a tool 34, preferably a punch, is inserted into the hole 34 so as a portion of the tool 34 is located external to electrical housing 28. Then, a predetermined amount of force is exerted on the exterior of the knockout 2 so as to remove the knockout 2.

Figure 9:
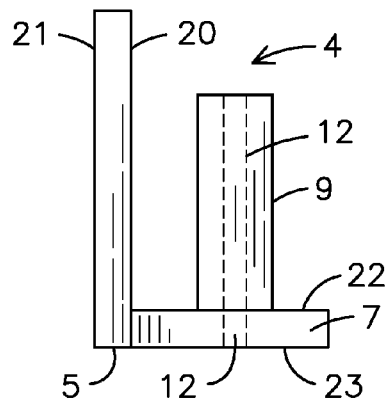
FIG. 9 is a side plan view of a second embodiment of an electrical housing knockout device of the present invention.

With reference to FIG. 9, a side plan view of a second embodiment of the electrical housing knockout device 4 of the present invention is shown. Rather than the sleeve element 8 being pivotal, the second embodiment of the electrical housing knockout device 4 of the present invention has the shaft 9 fixedly secured to the horizontal side top surface 22 of the bracket 5. Similar to the first embodiment, the second embodiment includes a central opening 12 which extends through the shaft 9 and through the horizontal side 7. In addition, the shaft 9 extends from the horizontal side top surface 22 in a perpendicular manner, as opposed to at an angle.

Figure 10:
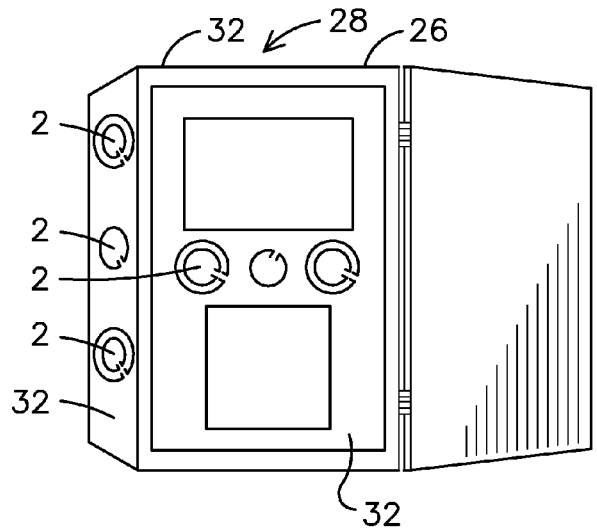
FIG. 10 is a front view of a circuit breaker cabinet having a plurality of pre-punched knockouts.

Next, FIG. 10 shows a front view of another electrical housing 28 having a plurality of knockouts 2, namely a circuit breaker cabinet 26 having a plurality of knockouts 2 located on various electrical housing walls 32, such as a top, bottom, side and rear walls of the circuit breaker cabinet 26. Thus, the electrical housing knockout device 4 of the present invention may also be used for removing knockouts 2 located in circuit breaker cabinets 26.

Figure 11:
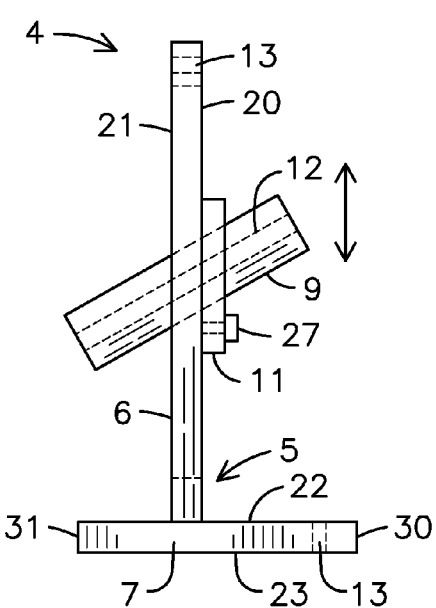
FIG. 11 is a side plan view of a third embodiment of an electrical housing knockout device of the present invention.

With respect to FIG. 11, a side plan view of a third embodiment of an electrical housing knockout device 4 of the present invention is shown. Similar to the first and second embodiments, the electrical housing knockout device 4 of the present invention includes a shaft 9 having a central opening 12 secured to a bracket 5 having a vertical side 6 and a horizontal side 7. The horizontal side 7 has a first end 30 and a second end 31 wherein the vertical side 6 is secured to the horizontal side 7 in a perpendicular manner between the horizontal side first end 30 and the horizontal side second end 31. In addition, a securing means 13 is located on the bracket 5 to secure the electrical housing knockout device 4 within an electrical housing 28 and a tightening means 27 is located on the collar 11.

Figure 12:
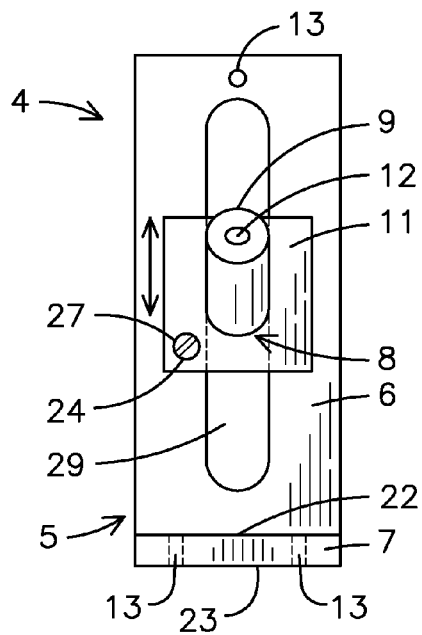
FIG. 12 is a front plan view of the embodiment of FIG. 11.

Finally, FIG. 12 shows a front plan view of the third embodiment of the electrical housing knockout device 4 of the present invention. The electrical housing knockout device 4 of the third embodiment permits upward and downward movement of the shaft 9 along a slot 29 located in the vertical side 6. The tightening means 28, which is preferably a screw 24, permits a user to lock the shaft 9 in a predetermined position along the vertical side 6 by placing a predetermined amount of force through the collar 11 on the vertical side 6. In this manner, a user may insert a drill bit 16 into the central opening 12 to create a hole in a knockout 2 in an electrical housing 28. In addition, at least one securing means 13 may be located on the vertical side 6 or horizontal side 7 of the bracket 5.

To use the third embodiment of the present invention, the second end 31 of the horizontal side 7 is placed adjacent to an electrical housing wall 32 having the desired knockout 2 to be removed. Then, the shaft 9 is moved in an upward or downward direction to align the central opening 12 over the desired knockout 2 to be removed. Similar to the other embodiments, a drill bit 16 is inserted into the central opening and the attached drill 25 is powered so as to create a hole 33 in the knockout 2. A tool 34, such as a punch, is then inserted into the hole 33 created in the knockout 2 so as a portion of the tool 34 is located external to the electrical housing 28. The tool 34 is then manipulated so as to exert a force on the desired knockout 2 and the knockout 2 is then removed.

The use of the present invention will permit a person to quickly and easily create a hole in a desired knockout from within the electrical housing. Once the hole is created, the user then inserts a tool through the hole so as to apply a force on the exterior of the knockout, thereby removing the knockout.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A electrical housing knockout device comprising:
   a bracket having a horizontal side and a vertical side;
   said horizontal side having a top surface and a bottom surface;
   said vertical side having a proximal surface and a distal surface;
   said horizontal side being perpendicularly connected to said vertical side;
   a shaft secured to said horizontal side top surface; and
   a central opening extending through said shaft wherein said central opening extends through said horizontal side.

2. The electrical housing knockout device of claim 1 wherein:
   said shaft is pivotally secured to said horizontal side top surface.

3. The electrical housing knockout device of claim 2 wherein:
   said horizontal side has at least one stopper extending a predetermined distance above said horizontal side top surface;
   said horizontal side has at least one opening;
   said shaft has a base;
   said central opening extends through said base;
   said base extends into said at least one opening in said horizontal side.

4. The electrical housing knockout device of claim 3 further comprising:
   a collar adjacent to said horizontal side and located between said shaft and said base;
   said collar having at least one aperture predeterminedly sized and shaped for movement about said stopper.

5. The electrical housing knockout device of claim 4 wherein:
   said shaft extends from said collar at a predetermined angle.

6. The electrical housing knockout device of claim 3 wherein:
   said stopper is a pin extending a predetermined distance above said horizontal side top surface.

7. The electrical housing knockout device of claim 1 wherein:
   said shaft extends from said horizontal side top surface at a predetermined angle.

8. The electrical housing knockout device of claim 1 further comprising:
   a means for securing said bracket to an interior of a electrical housing.

9. The electrical housing knockout device of claim 8 wherein:
   said means for securing said bracket to an interior of a electrical housing is via at least one magnet located on said vertical side distal surface.

10. The electrical housing knockout device of claim 8 wherein:
    said means for securing said bracket to an interior of an electrical housing is via at least one screw inserted through a hole on said vertical side.

11. A electrical housing knockout device comprising:
    a bracket having a horizontal side and a vertical side;
    said horizontal side having a top surface and a bottom surface;
    said vertical side having a proximal surface and a distal surface;
    said horizontal side being perpendicularly connected to said vertical side;
    said horizontal side having at least one pin extending from said horizontal side top surface;
    said horizontal side having at least one opening;
    a sleeve element pivotally secured to said horizontal side top surface;
    said sleeve element having a shaft and a base wherein a central opening extends through said shaft and through said base;
    said sleeve element base extends into said at least one opening in said horizontal side;
    said sleeve element having a collar adjacent to said horizontal side and located between said shaft and said base;
    said shaft extending from said collar at a predetermined angle;
    said collar having at least one aperture predeterminedly sized and shaped for movement about said stopper; and
    at least one magnet located on said vertical side distal surface for securing said bracket to an interior of a electrical housing.

12. The electrical housing knockout device of claim 11 further comprising:
    at least one securing means located on said vertical side.

13. The electrical housing knockout device of claim 12 wherein:
    a screw is inserted in said at least one securing means located on said vertical side so as to secure said bracket to an interior of an electrical housing.

14. An electrical housing knockout device comprising:
    a bracket having a horizontal side and a vertical side;
    said horizontal side having a top surface and a bottom surface;
    said horizontal side having a first end and a second end;
    said vertical side having a proximal surface and a distal surface;
    said vertical side being perpendicularly connected to said horizontal side at a predetermined location between said first end and said second end;
    said vertical side having at least one slot;
    a shaft adjustably secured to said vertical side at least one slot; and
    a central opening extending through said shaft wherein said central opening extends through said at least one slot.

15. The electrical housing knockout device of claim 14 further comprising:
    a means for tightening said shaft to said vertical side.

16. The electrical housing knockout device of claim 14 further comprising:
    a collar secured to said shaft and located adjacent to said vertical side proximal surface.

17. The electrical housing knockout device of claim 16 further comprising:
    a collar secured to said shaft and located adjacent to said vertical side proximal surface.

18. The electrical housing knockout device of claim 14 further comprising:
    at least one securing means located on said horizontal side.

19. The electrical housing knockout device of claim 14 further comprising:
    at least one securing means located on said vertical side.

* * * * *